Patented June 25, 1940

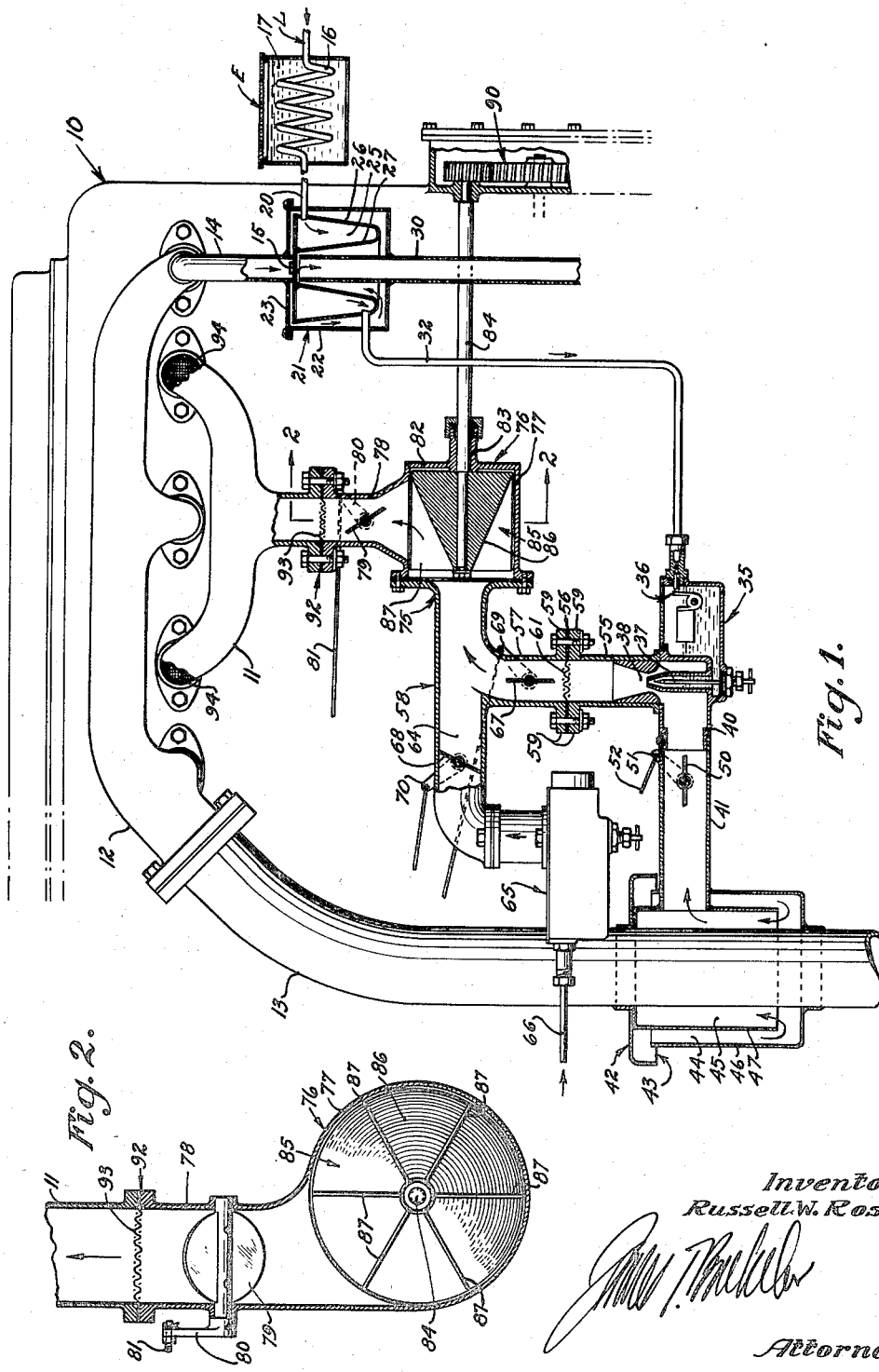

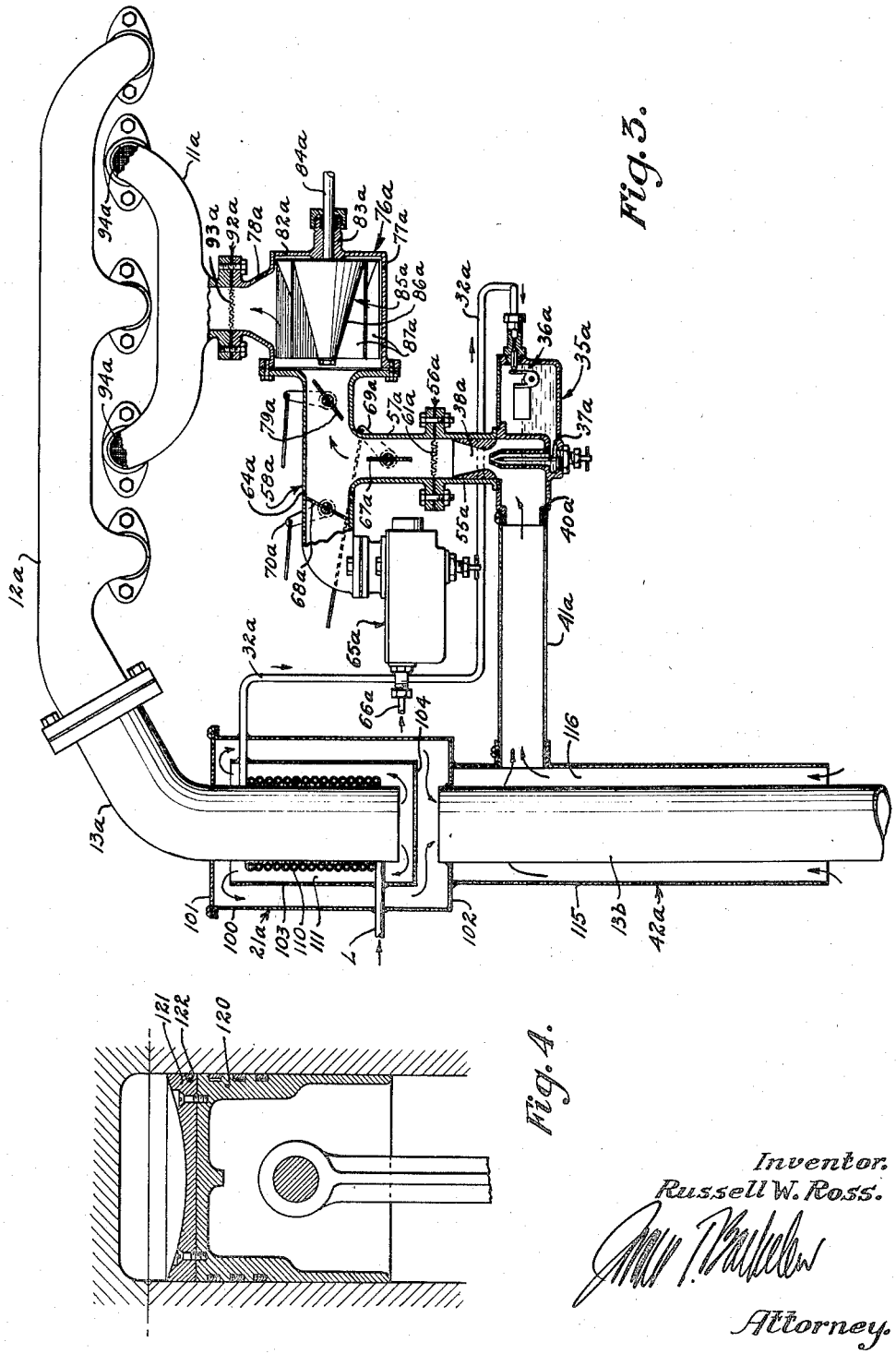

2,205,750

UNITED STATES PATENT OFFICE 2,205,750

FUEL SYSTEM FOR ENGINES

Russell W. Ross, near Porterville, Calif.

Application January 3, 1939, Serial No. 249,026

5 Claims. (Cl. 123—119)

This invention relates generally to fuel systems for internal combustion engines, and more particularly to systems designed for use of relatively heavy or non-volatile fuel, such as Diesel oil.

It is the general object of the present invention to provide a fuel system for internal combustion engines capable of effective and efficient carburization of relatively heavy fuel.

A more particular object is to provide a system for supplying to the engine, under positive pressure, a heavy fuel which is pre-heated, finely broken up, and uniformly distributed and mixed with pre-heated air in proper proportions for efficient combustion.

A further object of the invention is to provide an improved fuel system for internal combustion engines, of the type employing a light fuel such as gasoline for starting and heating the engine, and a heavy fuel such as Diesel oil for running once the engine has been heated.

In accordance with the present invention, an auxiliary gasoline tank and carbureter are provided for initially starting and heating the engine. Once the engine is heated, the gasoline system is cut off and the heavy fuel system cut in. The latter includes a heat exchanger, by which heat from the exhaust gases leaving the engine is utilized to warm the incoming heavy fuel, a carbureter for the heavy fuel, a preheater for the air mixed with the fuel by the carbureter, a means, illustratively in the form of a fine screen, for breaking up the heavy fuel and uniformly distributing it, and a blower or fan which agitates the mixture violently to keep the fuel distributed and in suspension and to further break it into fine particles, and operating also to supercharge the engine. The air taken in by the heavy-fuel carbureter is preheated by means of a heat exchanger receiving heat from the exhaust gases of the engine. Preferably, both the gasoline and the heavy fuel carbureters feed fuel to the intake manifold through the above mentioned fan or blower, and a single throttle is provided for controlling the fuel fed to the engine, being located either ahead of or beyond the fan. There may be advantage in location of the throttle ahead of the fan, in that restrictions beyond the fan, which might interfere with maximum break-up and distribution of the fuel, are thereby avoided.

The invention will be best understood from a consideration of the following described exemplifications thereof, reference for this purpose being had to the accompanying drawings, in which:

Fig. 1 is a somewhat diagrammatic view showing, in part, the side of an internal combustion engine, and illustrating the application thereto of a typical form of the present invention;

Fig. 2 is a section on line 2—2 of Fig. 1;

Fig. 3 is a view showing a modification of the invention; and

Fig. 4 is a cross section of a cylinder of the engine showing a cup device which is preferably mounted on each piston when the system of the present invention is employed.

In Fig. 1 of the drawings, numeral 10 designates generally an internal combustion engine, having intake manifold 11, exhaust manifold 12, main exhaust pipe 13 and branch exhaust pipe 14.

The heavy fuel supply line, which will be understood to lead from a suitable supply tank, is indicated in Fig. 1 by letter L. Connected into line L is a heat exchanger E, comprising a coil 16 and water tank 17. The water within this heat exchanger extracts heat from coil 16, and serves to keep the heat from being conducted back along the fuel line and through the fuel into the main fuel supply tank. The water can be continuously circulated through tank 17 through suitable connections, not shown.

The fuel flows from this cooling device to the inlet 20 of a fuel heater 21, which may be of any suitable type. For illustrative purposes, I have shown heater 21 as utilizing heat obtained from branch exhaust pipe 14. In the instance of the illustrative fuel heater shown in Fig. 1, branch exhaust pipe 14 discharges by way of lateral slots 15 into the upper end of a casing 22 over a spreader disk 23. The fuel passes into and around an annular compartment 25 defined at the top by spreader disk 23 and at the sides and bottom by annular walls 26 and 27. The hot exhaust gases pass downwardly outside compartment 25 and then inwardly and upwardly on the inside of said compartment to the top of exhaust outlet pipe 30, the open upper end of which is spaced a short distance below spreader disk 23.

The fuel introduced to compartment 25 is heated by both walls 26 and 27, and the heated fuel leaves compartment 25 by way of delivery line 32 connected with the lower end of compartment 25, in the manner clearly illustrated in Fig. 1.

The heated fuel delivered by way of line 32 is conducted to heavy-fuel carbureter 35, which may be of any suitable type, but in the preferred arrangement, has no throttle. As diagrammatically indicated in Fig. 1, the introduction of fuel to the carbureter is controlled by a conventionally illustrated float valve 36. The carbureter is typically shown to have a needle valve 37 and Venturi throat 38.

Connected to carburetor air inlet 40 is a pipe 41 leading from a suitable air heater 42, a typical form of which is illustrated in Fig. 1. As shown in Fig. 1, this air heater surrounds and receives heat from the main exhaust pipe 13. The air enters the heater 42 at 43, passing successively through annular concentric passageways 44 and 45 formed between sleeves 46 and 47, and between sleeve 47 and the exhaust pipe. The aforementioned heated-air pipe 41 communicates with the passageway 45 adjacent exhaust pipe 13.

Preferably, air inlet pipe 41 is provided with a choke valve 50, controlled as by lever 51 and link 52.

Carburetor outlet 55 is coupled at 56 to an intake conection 57 of a pipe fitting generally indicated by numeral 58. The coupling at 56 comprises bolted pipe flanges 59, and mounted between said flanges 59 and extending across the fuel passageway is a fine screen 61, typically of approximately 60 mesh, designed to break up and distribute the heavy fuel.

Pipe fitting 58 has a second intake connection 64 to which is coupled a gasoline carburetor 65 of any suitable type, the latter being fed with gasoline by way of fuel line 66 which will be understood to lead from a suitable gasoline tank, not shown. Butterfly valve 67 and 68 are placed in intake connections 57 and 64, respectively, being controlled by any suitable linkages, such as indicated at 69 and 70, respectively. Butterfly valves 67 and 68 are cut-off valves rather than throttles, valve 67 being open and valve 68 closed when the heavy fuel system is functioning, and the reverse being true when the gasoline system is used during starting and preliminary heating.

The outlet pipe or connection 75 of pipe fitting 58 leads to a fan or blower 76. As here illustratively shown, this blower 76 has a cylindric chamber 77, to one end of which is coupled the aforementioned fuel delivery connection 75. Chamber 77 is provided in one side with a tangential outlet 78, in which, in the illustrative form of the invention shown in Fig. 1, there is mounted the control throttle 79. The latter is operated by lever arm 80 and link 81 from any suitable or usual control means, not shown.

The closed end 82 of fan chamber 77 is provided with a bearing 83 for a shaft 84 on which fan rotor 85 is mounted. This rotor 85, as here illustratively shown, comprises a conical portion 86, presenting an angular or conical deflecting surface for the fuel entering the fan chamber, and has radial fins or blades 87 turning adjacent the cylindric walls of chamber 77.

The drive shaft 84 for fan 76 is driven through gearing, such as indicated at 90, from the engine, the drive ratio preferably being such that the fan rotor turns over at a speed of from two to three times engine speed.

Fan outlet 78 is coupled to intake manifold 11 as indicated at 92, and extending across the fuel passage at the location of that coupling is a second fine screen 93, again preferably of approximately 60 mesh. Preferably, further fine screens 94 are placed across the fuel passages where intake manifold 11 is connected to the side of the engine, in the manner clearly illustrated in Fig. 1.

The operation of the system is as follows: For starting and preliminary heating, valve 67 will be closed and valve 68 opened. The light fuel (gasoline) will at this time be fed by carburetor 65 to pipe fitting 58, and from there by way of blower 76 to the intake manifold. When the engine has been heated, control valve 67 is opened and control valve 68 closed, thereby cutting in the heavy fuel system and cutting off the light fuel feed. Heavy fuel carburetor 35 receives heated fuel from fuel heater 21 (which latter is preferably designed to heat the fuel about as high as can be reached without vaporizing it) and heated air from air heater 42. The heated mixture delivered from carburetor outlet 55 passes through fine screen 61, which acts to break the heavy fuel up into fine particles and to distribute them uniformly in the air. This finely broken up and uniformly distributed mixture next goes to blower 76, which performs two functions. Turning over at high speed, it agitates the mixture violently to further break the fuel into fine particles and to keep it distributed and in suspension. The blower also raises the pressure on the engine intake, so that the engine is fed under a positive pressure rather than solely by cylinder suction. The fine screens located at 93 and at 94 function to keep the mixture broken up into small, uniformly distributed particles suspended in the current of pressure air. The mixture finally delivered from intake manifold 11 is thus thoroughly heated, broken into fine uniformly distributed particles, and introduced to the engine under positive pressure. Practical test and operation has demonstrated that the system is efficient and highly satisfactory, and that by its use, internal combustion engines originally designed to operate on gasoline will run very well on Diesel oil.

Attention is called to the fact that both the control throttle and the blower are located beyond the juncture of the light and heavy fuel mixture supply lines. This is of importance, since if the light fuel connection were to connect into the system at a point on the engine side of fan 76, the operation of the fan would develop considerable suction in the heavy fuel supply line, sufficient to draw in additional air even though butterfly valve 67 were turned to closed position. In such case, proper carburetion of the light fuel would not be had. By feeding both the heavy and the light fuel mixtures through blower 76, this condition is avoided.

Fig. 3 shows a modification involving variational fuel and air heater structures, and involving placement of the control throttle ahead of the blower. For convenience, members of Fig. 3 corresponding to members of Fig. 1 will be identified by the same numerals but with the sub letter $a$ adjoined. The heavy fuel supply line, again indicated by L, leads by way of heater 21a to heavy fuel carbureter 35a.

Fuel heater 21a, as illustrated in Fig. 3, comprises a casing 100 fitted around exhaust pipe 13a. Exhaust pipe 13a extends downwardly through the top 101 of heater 21a and has an open, downwardly discharging end spaced somewhat from the lower wall 102 of the heater. A continuation 13b of the exhaust pipe has an open upper end extending through bottom heater wall 102, as illustrated. A sleeve or cylinder 103 having a closed lower end 104 is mounted in casing 100, with its side walls spaced between exhaust pipe 13a and heater side wall 100, and with its bottom wall 104 spaced between the lower end of exhaust pipe 13a and the upper end of exhaust pipe continuation 13b.

Fuel line L is connected to the lower end of a coil 110 disposed about exhaust pipe 13a, the upper end of said coil being connected by line 32a to heavy fuel carbureter 35a. The hot exhaust gases discharged from the lower end of exhaust pipe 13a rise upwardly in the space 111 between coil 110 and sleeve 103, so that coil 110 is warmed both by its contact with the exhaust pipe and also by contact of the rising gases within space 111, said gases upon leaving space 111 passing downwardly between walls 100 and 103 and finally leaving by way of exhaust pipe 13b.

The air heater, generally designated by numeral 42a, consists of a sleeve 115 extending downwardly from lower wall 102 and annularly spaced from exhaust pipe 13b, carbureter air supply pipe 41a opening to the annular space 116 between sleeve 115 and exhaust pipe 13b at a point near the upper end thereof. Thus, air is drawn inside the lower end of sleeve 115, being heated by contact with exhaust pipe 13b as it passes upwardly through annular space 116 to air pipe 41a.

In this instance, the control throttle, indicated at 79a, is shown as located ahead of blower 76a, being placed in the outlet portion of pipe fitting 58a, beyond the juncture of carbureter connections 57a and 64a. This has the advantage that blower 76a does not operate against the restriction of the throttle. It will of course be evident that the throttle may similarly be placed ahead of the blower in the form of the invention shown in Fig. 1. The balance of the system may be substantially the same as shown in Fig. 1, corresponding parts being designated by similar numerals but with the sub letter a adjoined in the case of Fig. 3.

Aside from the difference occasioned by the use of the control throttle ahead of the blower, the form of the invention shown in Fig. 3 operates the same as the form of Fig. 1, the only difference being in the construction of the heaters.

Fig. 4 is a cross section of a cylinder of the engine, showing the application to the head of piston 120 of a cup member 121, the periphery of which slidably fits cylinder wall surface 122. The purpose of this cup is to catch any heavy end products which might not be subject to instant combustion and to hold same until they can be burned. The provision of this cup prevents such products from escaping downwardly around the sides of the piston.

While I have now shown certain specific means for carrying my invention into effect, it will be understood that various changes in design, structure and arrangement may be made without departing from the spirit and scope of the invention or of the appended claims.

I claim:

1. A fuel feed system for an internal combustion engine comprising: a fuel preheater receiving heat from the engine exhaust, an air preheater receiving heat from the engine exhaust, a heavy fuel carbureter receiving heated heavy fuel and heated air from said fuel and air preheaters, respectively, a fuel mixture line leading from said carbureter to the intake of the engine, means extending across said line adapted to break up the fuel into fine uniformly distributed particles, a power driven fan in said line adapted to violently agitate the fuel and break it into fine particles, and also to raise the pressure of the fuel mixture, and a control throttle in said line.

2. A fuel feed system for an internal combustion engine comprising a heavy fuel carbureter arranged to receive and mix heated heavy fuel and heated air, a fuel mixture line leading from said carbureter to the intake of the engine, a fine screen across said line adapted to break up the fuel into fine uniformly distributed particles, a power driven fan in said line on the engine side of said screen adapted to violently agitate and sub-divide the finely broken fuel particles and keep them in suspension, and also to raise the pressure of the fuel mixture, and a control throttle in said line.

3. A fuel feed system for an internal combustion engine comprising a heavy fuel carbureter arranged to receive heated heavy fuel and heated air, a fuel mixture line leading from said carbureter to the intake of the engine, a fine screen across said line adapted to break up the fuel into fine uniformly distributed particles, a power driven fan in said line adapted to violently agitate and sub-divide the finely broken fuel particles and keep them in suspension, and also to raise the pressure of the fuel mixture, a control throttle in said line, and another fine screen extending across said line on the engine side of said fan and said throttle.

4. A fuel feed system for an internal combustion engine comprising a heavy fuel carbureter arranged to receive and mix heated heavy fuel and heated air, a main fuel mixture line leading from said carbureter to the intake of the engine, a power driven fan in said line adapted to violently agitate the fuel and break it into fine particles, and also to raise the pressure of the fuel mixture, a light fuel carbureter, a light fuel mixture line leading from said light fuel carbureter and joining with said main fuel mixture line at a point between said fan and said heavy fuel carbureter, a control throttle in said main fuel mixture line at a point on the engine side of the juncture of said two fuel mixture lines, a shut-off valve in said main fluid mixture line ahead of said fuel line juncture, and a shut-off valve in said light fuel mixture line.

5. A fuel feed system for an internal combustion engine comprising a heavy fuel carbureter arranged to receive and mix heated heavy fuel and heated air, a fuel mixture line leading from said carbureter to the intake of the engine, means extending across said line adapted to break up the fuel into fine particles, a power driven fan in said line on the engine side of said screen adapted to violently agitate and sub-divide the finely broken fuel particles and keep them in suspension, and also to raise the pressure of the fuel mixture, and a control throttle in said line.

RUSSELL W. ROSS.